(12) United States Patent
Liu et al.

(10) Patent No.: US 11,320,551 B2
(45) Date of Patent: May 3, 2022

(54) TRAINING MACHINE LEARNING SYSTEMS FOR SEISMIC INTERPRETATION

(71) Applicant: ExxonMobil Upstream Research Company, Spring, TX (US)

(72) Inventors: Kuang-Hung Liu, Basking Ridge, NJ (US); Wei D. Liu, Schenectady, NY (US); Huseyin Denli, Basking Ridge, NJ (US); Cody J. MacDonald, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 237 days.

(21) Appl. No.: 16/685,707

(22) Filed: Nov. 15, 2019

(65) Prior Publication Data
US 2020/0183032 A1    Jun. 11, 2020

Related U.S. Application Data

(60) Provisional application No. 62/881,760, filed on Aug. 1, 2019, provisional application No. 62/777,941, filed on Dec. 11, 2018.

(51) Int. Cl.
*G01V 1/28* (2006.01)
*G01V 1/30* (2006.01)
(Continued)

(52) U.S. Cl.
CPC .............. *G01V 1/282* (2013.01); *G01V 1/301* (2013.01); *G06N 3/0454* (2013.01); *G06N 3/08* (2013.01)

(58) Field of Classification Search
USPC .......................................................... 702/14
See application file for complete search history.

(56) References Cited

U.S. PATENT DOCUMENTS

| 5,444,619 A | 8/1995 | Hoskins et al. |
| 5,940,777 A | 8/1999 | Keskes |

(Continued)

FOREIGN PATENT DOCUMENTS

| EP | 0 561 492 B1 | 1/1998 |
| WO | WO 2006/009646 | 1/2006 |

(Continued)

OTHER PUBLICATIONS

Akcelik et al. (2011) "Multiparameter Material Model and Source Signature Full Waveform Inversion," *SEG San Antonio 2011 Annual Meeting*, pp. 2406-2410.

(Continued)

*Primary Examiner* — Paul D Lee
(74) *Attorney, Agent, or Firm* — ExxonMobil Upstream Research Company—Law Department

(57) ABSTRACT

A method and apparatus for seismic interpretation including machine learning (ML). A method of training a ML system for seismic interpretation includes: preparing a collection of seismic images as training data; training an interpreter ML model to learn to interpret the training data, wherein: the interpreter ML model comprises a geologic objective function, and the learning is regularized by one or more geologic priors; and training a discriminator ML model to learn the one or more geologic priors from the training data. A method of hydrocarbon management includes: training the ML system for seismic interpretation; obtaining test data comprising a second collection of seismic images; applying the trained ML system to the test data to generate output; and managing hydrocarbons based on the output. A method includes performing an inference on test data with the interpreter and discriminator ML models to generate a feature probability map representative of subsurface features.

21 Claims, 14 Drawing Sheets

(51) Int. Cl.
G06N 3/04 (2006.01)
G06N 3/08 (2006.01)

(56) References Cited

U.S. PATENT DOCUMENTS

| | | | |
|---|---|---|---|
| 6,374,185 B1 | 4/2002 | Taner et al. | |
| 6,438,493 B1 | 8/2002 | West et al. | |
| 6,662,112 B2 | 12/2003 | Eastwood et al. | |
| 6,735,526 B1 | 5/2004 | Meldahl et al. | |
| 7,844,402 B2 | 11/2010 | Klein et al. | |
| 8,055,026 B2 | 11/2011 | Pedersen | |
| 9,366,772 B2 | 6/2016 | Imhof | |
| 9,489,769 B2 | 11/2016 | Luneburg et al. | |
| 9,618,639 B2 | 4/2017 | Witte et al. | |
| 2015/0234070 A1 | 8/2015 | Xu et al. | |
| 2015/0379431 A1* | 12/2015 | Stokes | G06N 7/005 706/11 |
| 2016/0102262 A1 | 4/2016 | Moore | |
| 2017/0364795 A1 | 12/2017 | Anderson et al. | |
| 2018/0106917 A1 | 4/2018 | Osypov et al. | |
| 2018/0120461 A1 | 5/2018 | Allegar et al. | |
| 2018/0306940 A1 | 10/2018 | Basler-Reeder et al. | |
| 2019/0064378 A1 | 2/2019 | Liu et al. | |
| 2019/0162868 A1 | 5/2019 | Salman et al. | |
| 2019/0169962 A1 | 6/2019 | Aqrawi et al. | |
| 2019/0250294 A1 | 8/2019 | Salman | |
| 2019/0302290 A1* | 10/2019 | Alwon | G01V 1/364 |
| 2019/0383965 A1 | 12/2019 | Salman et al. | |
| 2019/0391295 A1 | 12/2019 | Salman et al. | |
| 2020/0278465 A1* | 9/2020 | Salman | G01V 1/345 |

FOREIGN PATENT DOCUMENTS

| | | |
|---|---|---|
| WO | WO 2007/060228 A1 | 5/2007 |
| WO | WO 2013/004275 A1 | 1/2013 |
| WO | WO 2014/116310 A1 | 7/2014 |
| WO | WO 2017/188858 A1 | 11/2017 |

OTHER PUBLICATIONS

Andersson et al. (2004) "T—H—M—C Modelling of Rock Mass Behaviour—1: The Purposes, The Procedures and the Products", *Geo-Engineering*, pp. 433-438.
Araya-Polo et al. (2017) "Automated fault detection without seismic processing," *The Leading Edge*, vol. 36, pp. 208-214.
Arjovsky et al. (2017) "Wasserstein GAN", pp. 1-32.
Aster et al. (2013) "Tikhonov Regularization", *Parameter Estimation and Inverse Problems*, pp. 93-127.
Baan et al. (2000) "Neural networks in geophysical applications", *Geophysics*, vol. 65, No. 4, pp. 1032-1047.
Backus et al. (1967) "Numerical applications of a formalism for geophysical inverse problems", *Geophysical Journal of the Royal Astronomical Society*, vol. 13, pp. 247-276.
Bellemare et al. (2017) "The Cramer Distance as a Solution to Biased Wasserstein Gradients", pp. 1-20.
Chan et al. (2017) "Parametrization and the Generation of Geological Models with Generative Adversarial Networks", pp. 1-28.
Chave et al. (2012) "Introduction to the magnetotelluric method", *The magnetoelluric method: theory and practice*, Cambridge University Press, pp. 1-18.
Chen et al. (2016) "InfoGAN: Interpretable Representation Learning by Information Maximizing Generative Adversarial Nets", *30th Conference on Neural Information Processing Systems*, pp. 1-9.
Cubuk et al. (2018) "AutoAugment: Learning Augmentation Policies from Data", pp. 1-14.
Denli et al. (2013) "Full-Wavefield Inversion for Acoustic Wave Velocity and Attenuation," *SEG Houston 2013 Annual Meeting*, pp. 980-985.
Duchi et al. (2011) "Adaptive subgradient methods for online learning and stochastic optimization", *Journal of Machine Learning Research*, vol. 12, pp. 2121-2159.

Etgen et al. (2009) "An overview of depth imaging in exploration geophysics", *Geophysics*, Vo.74, pp. WCA5-WCA17.
Etgen et al. (2010) "Introduction to this special section: Reverse time migration" *The Leading Edge*, vol. 29, p. 1363.
Fedus et al. (2018) "Many Paths to Equilibrium: GANs Do Not Need to Decrease a Divergence at Every Step", *International Conference on Learning Representation*, pp. 1-21.
Gibson et al. (2003) "Automatic Fault Detection for 3D Seismic Data," *DICTA* pp. 821-830.
Goodfellow et al. (2014) "Generative Adversarial Nets," *Advances in Neural Information Processing Systems 27, NIPS*, pp. 1-9.
Guillen et al. (2015) "Supervised learning to detect salt body", *SEG New Orleans 2015 Annual Meeting*, pp. 1826-1829.
Gulrajani et al. (2017) "Improved Training of Wasserstein GANs", *CoRR*, pp. 1-11.
Dave Hale (2013) "Methods to compute fault images, extract fault surfaces, and estimate fault throws from 3D seismic images", *Geophysics*, vol. 78, pp. O33-O43.
Hami-Eddine et al. (2012) "Anomaly Detection using dynamic Neural Networks, classification of prestack data", *SEG Las Vegas 2012 Annual Meeting*, pp. 1-5.
Hami-Eddine et al. (2015) "A new technique for lithology and fluid content prediction from prestack data: An application to a carbonate reservoir", Interpretation, vol. 3, No. 1, pp. S19-S32.
He et al. (2016) "Deep Residual Learning for Image Recognition," *2016 IEEE Conference on Computer Vision and Pattern Recognition (CVPR)*, pp. 770-778.
Hesthaven et al. (2007), "Nodal Discontinuous Galerkin Methods: Algorithms, Analysis, and Applications", *Springer, Texts in Applied Mathematics*, pp. 19-41.
Huang et al. (2017) "A scalable deep learning platform for identifying geologic features from seismic attributes", *The Leading Edge*, vol. 36, pp. 249-256.
Isola et al. (2018) "Image-to-Image Translation with Conditional Adversarial Networks", *2017 IEEE Conference on Computer Vision and Pattern Recognition*, pp. 5967-5976.
Janoos et al. (2014) "Multi-scale graphical models for spatio-temporal processes", *Advances in Neural Information Processing Systems*, vol. 27, pp. 316-324.
Jiang et al. (2016) "Detecting prospective structures in volumetric geo-seismic data using deep convolutional neural networks," Poster presented at the annual foundation council meeting of the Bonn-Aachen International Center for Information Technology (b-it), p. 1.
Ying Jiang (2017) "Detecting Geological Structures in Seismic Volumes Using Deep Convolutional Neural Networks", *Master Thesis from Rheinish-Westfalische Technische Hochschule Aachen*, p. 1-76.
Kingma et al. (2015) "Adam: A Method for Stochastic Optimization," *ICLR—Conference Paper*, pp. 1-15.
Koenderink et al. (1994) "Two-plus-one—Dimensional differential geometry," *Pattern Recognition Letters*, vol. 15, pp. 439-443.
Komatitsch et al. (2000) "The spectral element method for three-dimensional seismic wave propagation" *SEG Technical Program Expanded Abstracts*, pp. 2197-2200.
Krizhevsky et al. (2012) "ImageNet classification with deep convolution neural networks", *NIPS*, pp. 1-9.
LeCun, Y. (2015) "Deep Learning," *Nature*, vol. 521, pp. 436-444.
Lewis et al. (2017) "Deep learning prior models from seismic images for full-waveform inversion", *SEG Technical Program Expanded Abstracts*, pp. 1512-1517.
Leveque, R. J. (2002) "Finite volume methods for hyperbolic problems", Cambridge Texts in Applied Mathematics, Cambridge University Press, pp. 64-85.
Li et al. (2015) "Gravity and magnetic methods in mineral and oil & gas exploration and production", *EAGE*, pp. 15-24.
Lin et al. (2013) "A wavelet-based model compression method for three-dimensional electromagnetic data inversion", *SEG Houston 2013 Annual Meeting*, pp. 707-712.
Lin et al. (2017) "Building Subsurface Velocity Models with Sharp Interfaces Using Interface-Guided Seismic Full-Waveform Inversion", *Proceedings: Thirty-Ninth Workshop on Geothermal Reservoir Engineering*, pp. 1-8.

(56) References Cited

OTHER PUBLICATIONS

Lines et al. (2004) "Fundamentals of Geophysical Interpretation", Chapter 15, Geophysical Monograph Series, Society of Exploration Geophysicists, pp. 137-144.
Lines et al. (2004) "Fundamentals of Geophysical Interpretation", Chapter 16, Geophysical Monograph Series, Society of Exploration Geophysicists, pp. 145-158.
Lines et al. (2004) "Fundamentals of Geophysical Interpretation", Chapter 17, Geophysical Monograph Series, Society of Exploration Geophysicists, pp. 159-170.
Lines et al. (2004) "Fundamentals of Geophysical Interpretation", Chapter 18, Geophysical Monograph Series, Society of Exploration Geophysicists, pp. 171-180.
Long et al. (2015) "Fully Convolutional Networks for Semantic Segmentation," *Proceedings of the IEEE Computer Society Conference on Computer Vision and Pattern Recognition*, pp. 3431-3440.
Ma et al. (2012) "Image-guided sparse-model full waveform inversion", *Geophysics*, vol. 77, pp. R189-R198.
Macias et al. (2000) "Artificial neural networks for parameter estimation in geophysics", *Geophysical Prospecting*, vol. 48, pp. 21-47.
Marroquin et al. (2009) "A visual data-mining methodology for seismic facies analysis: Part 1—testing and comparison with other unsupervised clustering methods", *Geophysics*, vol. 74, pp. P1-P11.
Miller et al. (2001) "Seismic interpretation and processing applications", *Handbook of Geophysical Exploration*, pp. 101-118.
Moczo et al. (2007) "The finite-difference time-domain method for modeling of seismic wave propagation", *Advances in Geophysics*, vol. 48, pp. 421-516.
Mun et al. (2017) "Comparison of objective functions in CNN-based prostate magnetic resonance image segmentation", *2017 IEEE International Conference on Image Processing (ICIIP)*, pp. 3859-3863.
Nocedal et al. (2006) "Numerical optimization", *Springer Series in Operations Research and Financial Engineering*, pp. 10-29.
D. Oldenburg (1990) "Inversion of electromagnetic data: An overview of new techniques", *Surveys in Geophysics*, vol. 11 pp. 231-270.
*PaleoScan Software* available from Eliis, http://www.eliis.fr/products/paleoscan-software, downloaded Jul. 3, 2018, p. 1-2.
G. Partyka, (2017) "Seismic processing and analysis in service of interpretation", *SEG Technical Program Expanded Abstracts*, pp. 5261-5266.
Regone et al. (2017) "Geologic model building in SEAM Phase II—Land seismic challenges", The Leading Edge, pp. 738-749.
Ronneberger et al. (2015) "U-Net: Convolutional Networks for Biomedical Image Segmentation," *Medical Image Computing and Computer-Assisted Intervention (MICCAI)*, Springer, LNCS, vol. 9351, pp. 234-241.
Roth et al. (1994), "Neural networks and inversion of seismic data", *Journal of Geophysical Research*, vol. 99, pp. 6753-6768.
Sava et al. (2009), "Overview and classification of wavefield seismic imaging methods" *The Leading Edge*, vol. 28, pp. 170-183.
Schaefer et al. (2006) "Image deformation using moving least squares", *ACM Transactions on Graphics* vol. 25, pp. 533-540.
Schiesser (1991) "A PDE Second-Order in Time: The Hyperbolic Wave Equation", *The Numerical Method of Lines: Integration of Partial Differential Equations*, pp. 70-75.
Schiesser (1991) "Spatial Differentiation", *The Numerical Method of Lines: Integration of Partial Differential Equations*, pp. 97-122.
Simonyan, K. (2015) "Very Deep Convolutional Networks for Large-Scale Image Recognition," *ICLR 2015 Conference Paper*, pp. 1-15.
T. Smith (2017) "Geobody interpretation through multiattribute surveys, natural clusters and machine learning", *SEG International Exposition and $87^{th}$ Annual Meeting*, pp. 2153-2157.
Srivastava et al. (2014) "Dropout: A simple way to prevent neural networks from overfitting", *Journal of Machine Learning Research*, vol. 15, pp. 1929-1958.
Tarantola (2005) "Inverse problem theory and methods for model parameter estimation: Chapter 3 The Least-Squares Criterion", *SIAM* pp. 57-64.
Tschannen et al. (2017) "Facies classification from well logs using an inception convolutional network" XP080767099.
Virieux et al. (2009) "An overview of full-waveform inversion in exploration geophysics", *Geophysics*, vol. 74, pp. WCC1-WCC26.
Veillard et al. (2018) "Fast 3D Seismic Interpretation with Unsupervised Deep Learning: Application to a Potash Network in the North Sea", *80th EAGE Conference & Exhibition*, pp. 1-5.
Waldeland et al. (2018) "Convolutional neural networks for automated seismic interpretation", *The Leading Edge*, pp. 529-537.
Wang et al. (2008) "Advances in velocity model-building technology for subsalt imaging", *Geophysics*, vol. 73, pp. VE173-VE181.
Yilmaz (2001) "Seismic data analysis: Processing, inversion, and interpretation of seismic data", Investigations in Geophysics, Society of Exploration Geophysicists, pp. 463-476.
Zamir et al. (2018) "Taskonomy: Disentangling Task Transfer Learning", *Proceedings of the IEEE Conference on Computer Vision an Pattern Recognition*, pp. 3712-3722.
Zhang (2008) "Incorporating Geological Conceptual Models and Interpretations into Reservoir Modeling Using Multiple-Point Geostatistics", *Earth Science Frontiers*, vol. 15, pp. 26-35.
Zhang et al. (2016) "Automated Geophysical Feature Detection with Deep Learning," *GPU Technology Conference*, pp. 1-22.
Zhu et al. (2017) "Toward Multimodal Image-to-Image Translation", *$31^{st}$ Conference on Neural Information Processing Systems*, pp. 1-12.
Zou et al. (2004) "Statistical validation of image segmentation quality based on a spatial overlap index", *Academy of Radiology*, vol. 11, pp. 178-189.

\* cited by examiner

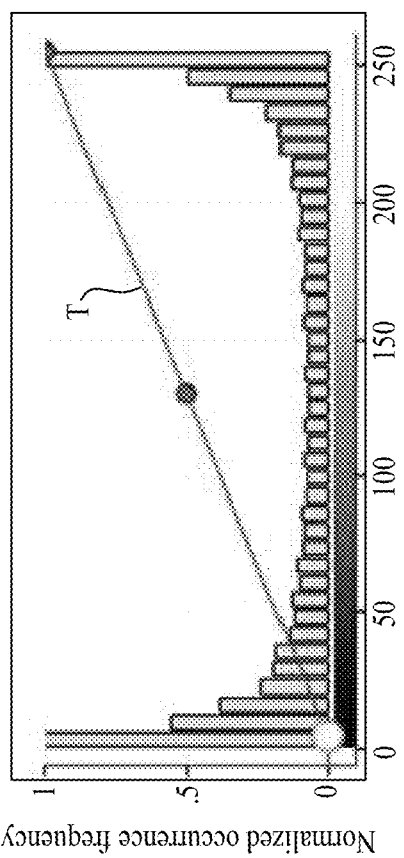
FIG. 8A
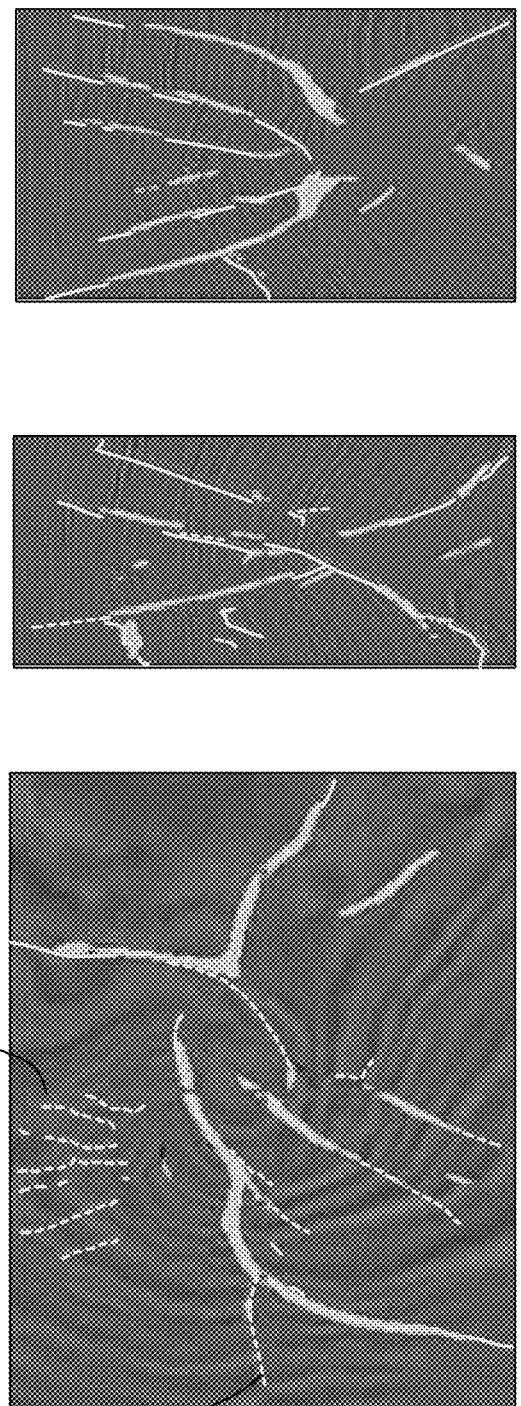
FIG. 8B
FIG. 8C
FIG. 8D

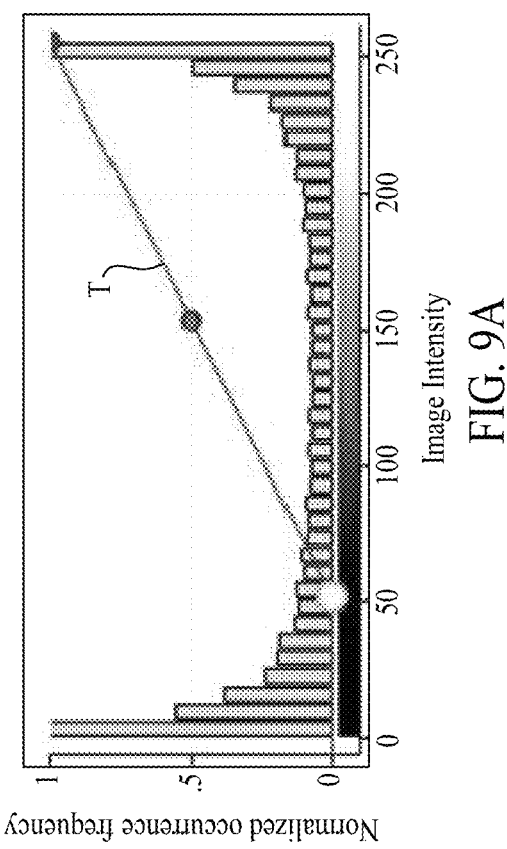
FIG. 9A
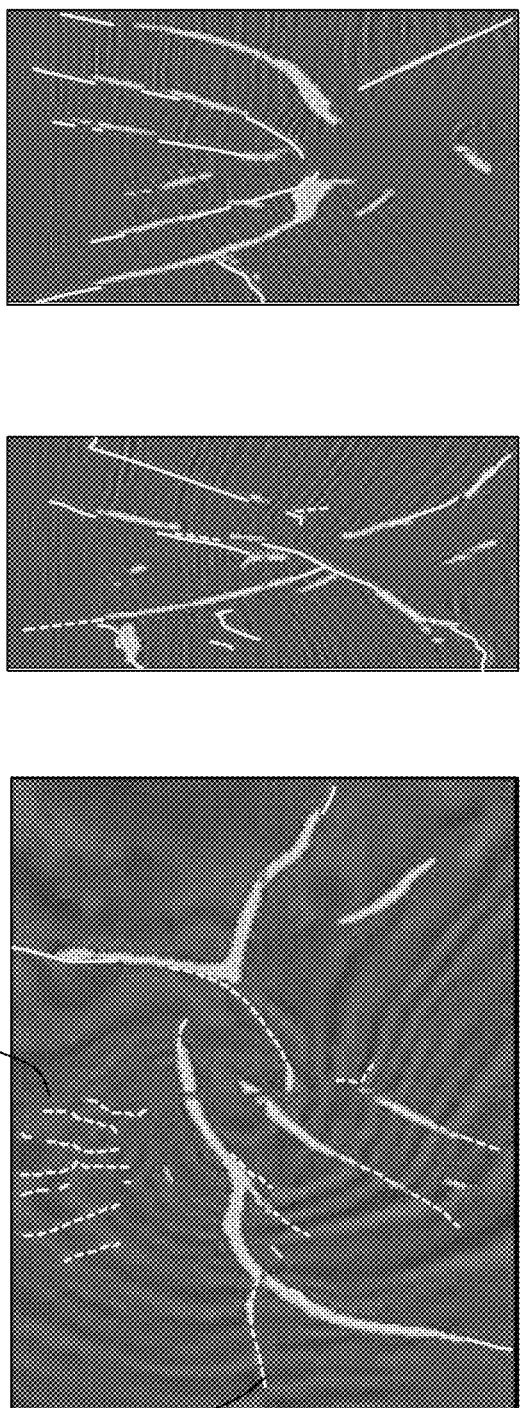
FIG. 9B
FIG. 9C
FIG. 9D

TRAINING MACHINE LEARNING SYSTEMS FOR SEISMIC INTERPRETATION

CROSS-REFERENCE TO RELATED APPLICATIONS

This application claims the benefit of U.S. Provisional Application 62/881,760, filed Aug. 1, 2019, entitled "Training Machine Learning Systems For Seismic Interpretation", and U.S. Provisional Application 62/777,941, filed Dec. 11, 2018, entitled "Automated Seismic Interpretation-Guided Inversion" the entirety of which are incorporated by reference herein.

FIELD

This disclosure relates generally to the field of geophysical prospecting and, more particularly, to seismic prospecting for identifying and managing hydrocarbon resources and related data processing. Specifically, exemplary embodiments relate to methods and apparatus for improving computational efficiency by using geologic objective functions and/or image priors to train seismic interpretation machine learning systems.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

An important step of hydrocarbon prospecting is to accurately model subsurface geologic structures. For example, seismic data may be gathered and processed to generate subsurface models that reveal geologic structure. Seismic prospecting is facilitated by acquiring seismic data during performance of a seismic survey. During a seismic survey, one or more seismic sources generate seismic energy (e.g., a controlled explosion, or "shot") which is delivered into the earth. Seismic waves are reflected from subsurface structures and are received by a number of seismic sensors or "receivers" (e.g., geophones). The seismic data received by the seismic sensors is processed in an effort to create an accurate mapping (including images of maps, such as 2-D or 3-D images presented on a display) of the subsurface region. The processed data is then examined (e.g., analysis of images from the mapping) with a goal of identifying subsurface structures that may contain hydrocarbons.

Geophysical data (e.g., acquired seismic data, reservoir surveillance data, etc.) may be analyzed to develop subsurface models. For example, seismic interpretation may be used to infer geology (e.g., subsurface structures) from seismic data (e.g., seismic images or models). For example, structural interpretation generally involves the interpretation of subsurface structures such as horizons, geobodies (e.g. salt anomaly), and/or faults from subsurface models (such as, e.g., pre-stack or partially-stack seismic images or attributes derived from seismic images). Structural interpretation is currently a laborious process that typically takes months of interpreters' time. As such, structural interpretation is, for example, one of the key bottlenecks in the interpretation workflow.

Automated seismic interpretation (ASI) can relieve such bottlenecks. For example, ASI may utilize a machine learning (ML) system with training data, such as data representing a broad set of geophysical and geological environments. The ML system may generate trained models based on the training data. The ML system may then apply the trained models to generate a seismic interpretation of a test dataset and/or infer geologic features therefrom.

Even with the state-of-the-art ASI methods, a significant amount of effort has traditionally been applied to horizon interpretation, salt interpretation and/or fault interpretation. Recently-proposed ASI methods have one or more of the following shortcomings: procedures are computationally too expensive for 3-D image applications (e.g., training the ML model for 3-D image interpretation; inference with the such trained ML model), results are represented in a pixelated space (pixel-by-pixel) and pixels are not grouped to represent an object (e.g., object extraction), and following therefrom, results are subject to additional, subjective post-processing, thus defeating the original goal of automation.

Some recently-proposed ASI methods utilize deep neural networks (DNNs). For example, horizon interpretation and/or fault interpretation problems have been staged as ML tasks, where a set of manually labeled images with horizon, salt and/or fault features are part of training data. Typically, ML systems utilize an objective function to characterize the error between manually labeled images and predicted labeling. However, training a DNN model with generic objective functions (e.g., binary cross entropy (BCE), mean squared error (MSE)) tends to compare errors pixel-by-pixel (regardless whether the errors are identified out of the entire volume or patches thereof), producing inferences that lack fine differentiations (overly smoothed). These generic objective functions may not capture geological priors and/or interpreters' knowledge (e.g., image priors) for learning seismic patterns. This may produce a large area of uncertainty between the resulting positive and negative samples. Such instances may then be subject to labor-intensive post-processing (e.g., a human interpreter may apply differentiating thresholds). The post-processing may create a degree of arbitrariness in choice of thresholding parameters. Moreover, the additional post-processing prevents a DNN system from being used in a fully-automated workflow.

Another challenge for prior ML systems related to ASI is potential class imbalance problems. For example, ML methods for learning seismic or geologic facies identification may suffer from a class imbalance problem when the class distributions are imbalanced (e.g., each class does not make up an equal portion of the dataset). If, for example, a ML system is to be trained to identify two facies, facies A and facies B, and if facies A is 90% of the training dataset and facies B is the other 10% of the training dataset, a potential class imbalance problem may result. Performance of the ML system can reach to 90% without learning to identify facies B, even when facies B is critical for the end goal. More efficient equipment and techniques to generate subsurface models would be beneficial.

SUMMARY

One or more embodiments disclosed herein apply to systems and methods for training machine learning models to effectively learn subsurface geological features from seismic datasets. One or more embodiments disclosed herein may apply to seismic interpretation models that constitute or are otherwise based on machine learning (ML) architectures, such as deep neural networks (DNNs) and/or convolutional neural networks (CNNs). One or more embodiments disclosed herein may include the use of a set of one or more geologic objective functions to train the ML models. For example, the one or more geologic objective functions may shape the resulting prediction output by the machine learning model to include characteristics that may be desirable for seismic interpretation. One or more embodiments disclosed here may include the use of image prior(s) in the training objectives. For example, the image prior(s) may be used to regularize and/or encourage certain desired and/or expected properties for seismic interpretation. In some embodiments, the training objectives may include Wasserstein distance, gradient penalty, and/or Cramer distance. In some embodiments, the image prior(s) may be automatically derived through an adversarial process. In some embodiments, the seismic interpretation may include fault prediction, horizon interpretation, channel detection, reservoir detection, salt-body detection, seismic facies detection, lithological facies detection, petrophysical facies detection, environment of deposition detection, and/or direct hydrocarbon indicator detection.

BRIEF DESCRIPTION OF THE DRAWINGS

So that the manner in which the recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of scope, for the disclosure may admit to other equally effective embodiments and applications.

FIGS. 1A, 2A, and 3A illustrate a histogram of fault predictions. FIGS. 1B-1D, 2B-2D, and 3B-3D, illustrate fault probability maps based on the histograms of FIGS. 1A, 2A, and 3A, respectively.

FIGS. 8A, 8B, 8C, 8D, 9A, 9B, 9C, 9D, 10A, 10B, 10C, 10D, 11A, 11B, 11C, 11D, 12A, 12B, 12C, 12D, 13A, 13B, 13C, and 13D illustrate fault prediction results based on use of a geologic objective function. FIGS. 8A, 9A, 10A, 11A, 12A, and 13A illustrate a histogram of fault predictions. FIGS. 8B-8D, 9B-9D, 10B-10D, 11B-11D, 12B-12D, and 13B-13D illustrate fault probability maps based on the histograms of FIGS. 8A, 9A, 10A, 11A, 12A, and 13A, respectively.

DETAILED DESCRIPTION

Figure 1A:
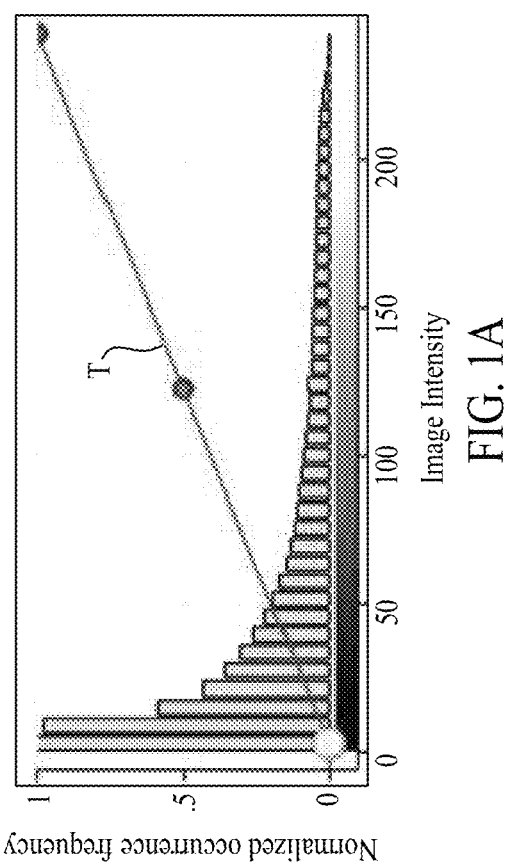
FIGS. 1A, 1B, 1C, 1D, 2A, 2B, 2C, 2D, 3A, 3B, 3C, and 3D illustrate fault prediction results based on use of a generic objective function.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation. Terms such as "maximize," "minimize," and "optimize" should be understood in the parlance of mathematical operations, representative of theoretical targets that may or may not be fully achievable in actual practice.

The term "seismic data" as used herein broadly means any data received and/or recorded as part of the seismic surveying process, including particle displacement, velocity and/or acceleration, pressure and/or rotation, wave reflection, and/or refraction data. "Seismic data" is also intended to include any data or properties, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic, gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model presented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations.

The term "label" generally refers to identifications and/or assessments of correct or true outputs provided for a given set of inputs. Labels may be of any of a variety of formats, including text labels, data tags (e.g., binary value tags), pixel attribute adjustments (e.g., color highlighting), n-tuple label (e.g., concatenation and/or array of two or more labels), etc.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

The term "real time" generally refers to the time delay resulting from detecting, sensing, collecting, filtering, amplifying, modulating, processing, and/or transmitting relevant data or attributes from one point (e.g., an event detection/sensing location) to another (e.g., a data monitoring location). In some situations, a time delay from detection of a physical event to observance of the data representing the physical event is insignificant or imperceptible, such that real time approximates instantaneous action. Real time may also refer to longer time delays that are still short enough to allow timely use of the data to monitor, control, adjust, or otherwise impact subsequent detections of such physical events.

If there is any conflict in the usages of a word or term in this specification and one or more patent or other documents that may be incorporated herein by reference, the definitions that are consistent with this specification should be adopted for the purposes of understanding this disclosure.

One of the many potential advantages of the embodiments of the present disclosure is that relational context may be accounted for in the training and output of machine-learning models for interpreting seismic images, over and above pixel-wise and/or area/volume-wise comparisons that do not adequately take into account geological context (noting that where a "pixel-wise" comparison is referenced herein, the analogous 3-D "voxel-wise" comparison is also contemplated, unless context expressly indicates otherwise). Other potential advantages include one or more of the following, among others that will be apparent to the skilled artisan with the benefit of this disclosure: producing sharp, geologically-consistent predictions for object extraction; incorporating geological priors and/or interpreters' expectations (e.g., image priors) into training for learning seismic patterns; automatically learning a geologically-meaningful prior for seismic images beyond pixel-wise evaluation (e.g., by using an adversarial learning process); facilitating geologically-meaningful object extractions; and overcoming class imbalance problem. Embodiments of the present disclosure can thereby be useful in hydrocarbon management, including in the prospecting for, discovery of, and/or extraction of hydrocarbons from subsurface formations.

Embodiments disclosed herein provide machine learning (ML) systems and methods with geologic objective functions designed to achieve a better model generalization across training, validation, testing, and/or inference with seismic datasets. For example, the geologic objective function may be a primary driver for shaping the characteristics and/or behavior of a neural network for seismic interpretation (e.g., fault prediction, reservoir detection, horizon interpretation, environment of deposition detection, and/or salt-body detection). In some embodiments, seismic interpretation may be constructed with accurate and/or desired image properties (e.g., geologic priors, such as priors based on the way geologic objects are expected to be identified in the images, such as sharp surfaces instead of diffusive interfaces). In some embodiments, the accuracy of the produced results may be improved with more sophisticated ML architectures and/or larger datasets. In some embodiments, automated seismic interpretation (ASI) may utilize ML systems and methods with geologic objective functions to improve training data, ML training efficiency, and/or ML inference accuracy. For example, ASI systems and methods may be used with ML systems to learn and/or infer subsurface features for one or more geologic scenarios from seismic images. Suitable ASI systems and methods are further described hereinbelow, and also are described in U.S. Provisional Application Ser. No. 62/849,574, entitled "Automated Seismic Interpretation Systems and Methods for Continual Learning and Inference of Geological Features," filed May 17, 2019, which is herein incorporated by reference.

In some embodiments, the predictive performance of the trained ML model may be affected by the selection and/or use of an objective function. In particular, the use of a non-task-specific objective function for training a ML model for seismic interpretation tasks (e.g., fault prediction, reservoir detection, horizon interpretation, environment of deposition detection, and/or salt-body detection) may not be geologically satisfactory.

Conventional supervised learning methods for training deep neural networks (DNNs) and/or convolutional neural networks (CNNs) tend to attempt to minimize a generic objective function. For example, taking the case of fault identification in 3-D input seismic data, a generic objective function such as binary cross entropy (BCE) may be expressed as:

$$BCE(y,p) = E_X[\Sigma N_{i,j,k}^{N_xN_yN_z} - (y_{ijk} \log(p_{ijk}) + (1-y_{ijk}) \log(1-p_{ijk}))] \quad (1)$$

where $y_{i,j,k}$ is typically a binary label (e.g., 1=fault; 0=no-fault) per voxel (or pixel), and $p_{i,j,k}$ is the DNN fault prediction per voxel, summed for all voxels (each with coordinates given by varying NxNyNz). Note that a set (or collection) of the x inputs are referred to as X, a set of the y labels are referred to as Y and a set of the p predictions are referred to as Y' or P. It will be noted that a similar functional form would be used in the 2-D case for pixels with coordinates varying $N_xN_y$.

Other commonly used objective functions may include the following (where the same nomenclature of the BCE example above is re-used):

$$\text{Jaccard index: } E_X \left[ \frac{\sum_{i,j,k}^{N_xN_yN_z} y_{ijk} p_{ijk}}{\sum_{i,j,k}^{N_xN_yN_z} (y_{ijk}^2 + p_{ijk}^2 - y_{ijk} p_{ijk})} \right] \quad (2)$$

$$\text{Dice index: } E_X \left[ \frac{2 \sum_{i,j,k}^{N_xN_yN_z} y_{ijk} p_{ijk}}{\sum_{i,j,k}^{N_xN_yN_z} (y_{ijk}^2 + p_{ijk}^2)} \right] \quad (3)$$

$$\text{Cosine similarity: } E_X \left[ \frac{\sum_{i,j,k}^{N_xN_yN_z} y_{ijk} p_{ijk}}{\sqrt{\sum_{i,j,k}^{N_xN_yN_z} (y_{ijk}^2) \sum_{i,j,k}^{N_xN_yN_z} (p_{ijk}^2)}} \right] \quad (4)$$

The use of a BCE and other objective function may allow previous methods to learn to roughly identify the locations of faults. However, use of a generic objective function may compare error pixel-by-pixel, thus failing to produce a geological and high-confidence prediction. For instance, an erroneous high amplitude spike on one voxel in the label may cause the ML model to focus on reconstructing the error instead of reconstructing the rest of the label, as illustrated in FIGS. 1A, 1B, 1C, 1D, 2A, 2B, 2C, 2D, 3A, 3B, 3C, and 3D.

Figure 1D:
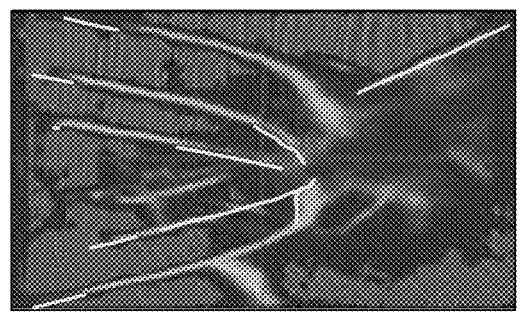
Figure 1C:
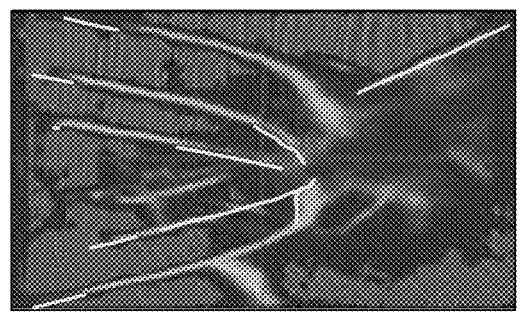
Figure 1B:
Figure 2A:
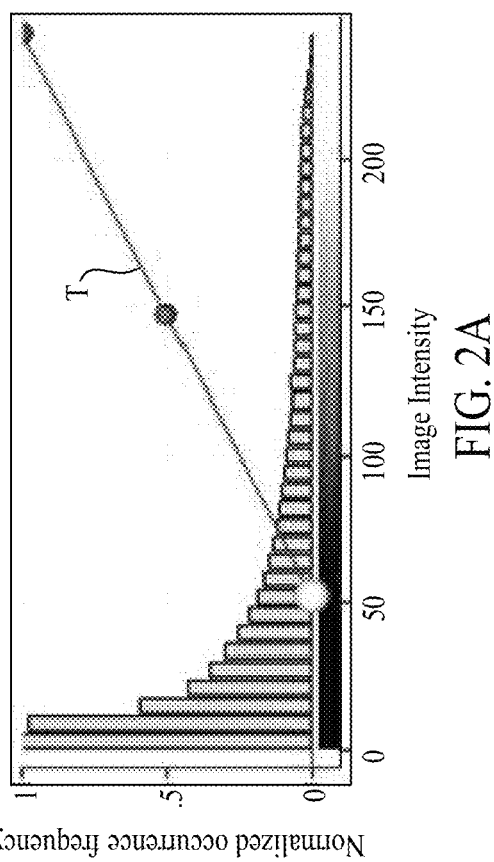
Figure 2D:
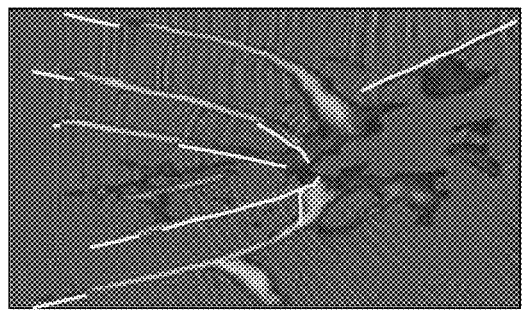
Figure 2C:
Figure 2B:
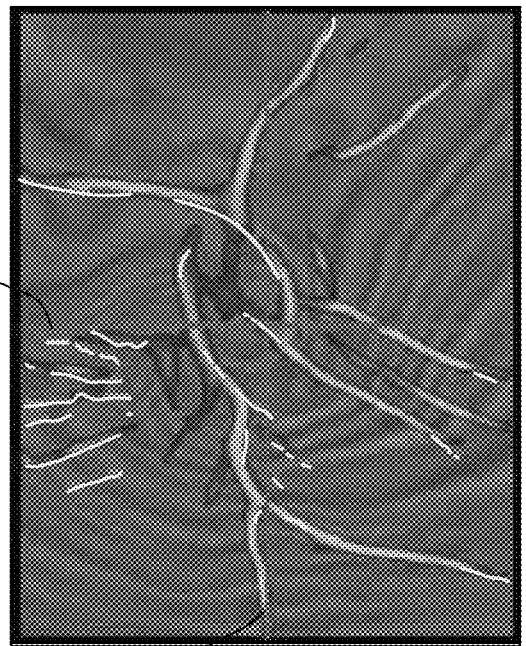
Figure 3A:
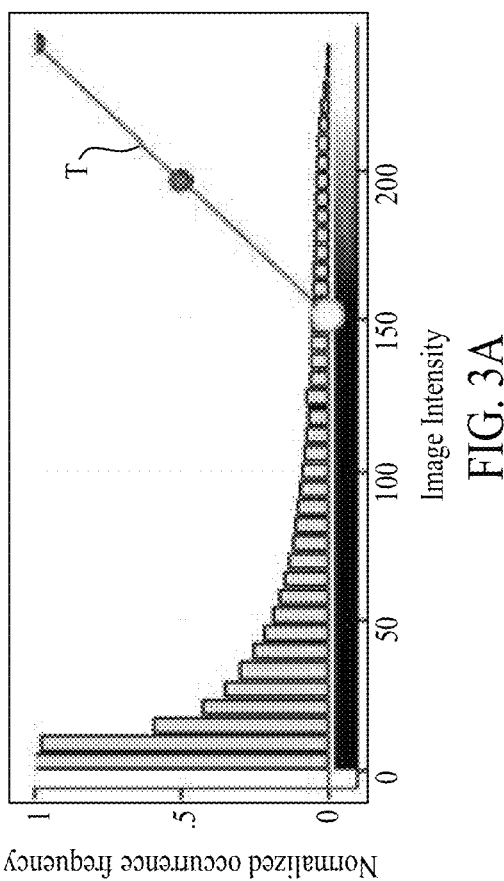
Figure 3D:
Figure 3C:
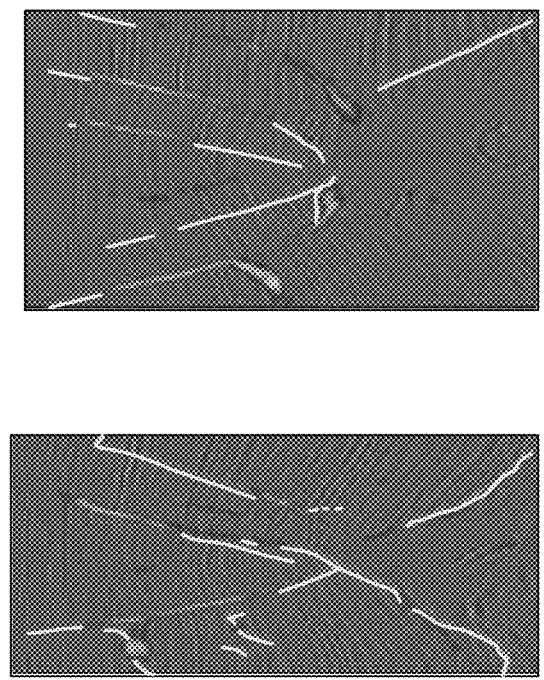
Figure 3B:
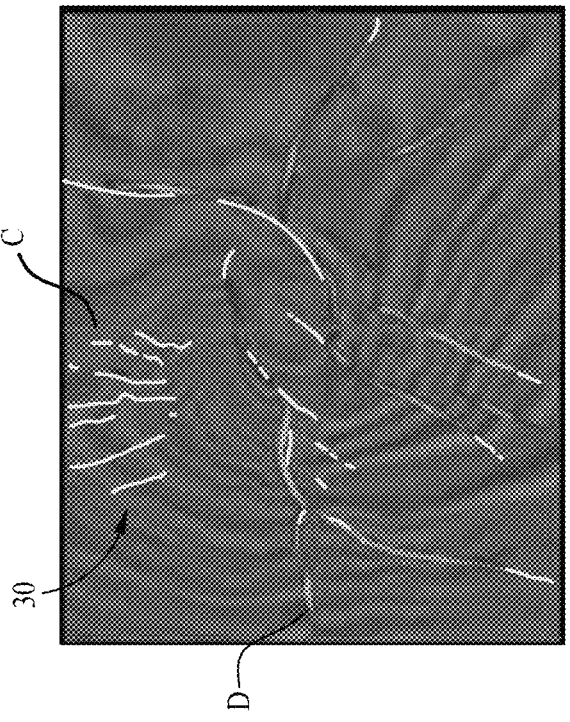

Each of FIGS. 1A, 2A, and 3A illustrates a histogram of fault predictions, ranging from normalized occurrence frequency 0 to 1, and image intensity level 0 to 255. FIGS. 1A, 2A, and 3A differ in the threshold selected to include in the fault probability maps of 1B-1D, 2B-2D, and 3B-3D, respectively (e.g., only predictions to the right of each threshold line T are opaque in the fault probability maps). Note that FIGS. 1C, 2C, and 3C are vertical slices (at line C) through each of FIGS. 1B, 2B, and 3B (respectively), and that FIGS. 1D, 2D, and 3D are horizontal slices (at line D) through each of FIGS. 1B, 2B, 3B (respectively). Also note that expected fault features (e.g., manually identified) are illustrated in green. FIGS. 1A-1D represent little-to-no thresholding, highlighting more potential fault features, but also more false positives. Low thresholding also produces images with blurry and/or non-geologic fault expressions. FIGS. 3A-3D represent strict thresholding, resulting in fewer false positives. Strict thresholding also produces geo-logically-reasonable fault expressions. However, strict thresholding may fail to create expressions of faults where faults are expected to occur (e.g., false negatives, such as line 30 in FIG. 3B). Note that in each histogram, there are a large number of predictions with low image intensity (i.e., a voxel concluded not likely to be a fault), with a substantial number of middle-confidence predictions (e.g., image intensity between about 30 and about 215), and a very small number of high-confidence predictions (higher image intensity). The illustrated method failed to produce both geologically meaningful and confident results.

Moreover, there is no clear a priori justification for selecting one of the thresholds of FIGS. 1A, 2A, and 3A over the others. FIGS. 1A, 1B, 1C, 1D, 2A, 2B, 2C, 2D, 3A, 3B, 3C, and 3D also illustrate that each voxel in the fault probability volume is independent of each other, spanning smoothly between 0 and 1. Because previous methods are only able to produce a fault probability map where fault predictions smoothly transition to non-fault region, interpreters are challenged to choose an appropriate threshold for fault detection.

Figure 4A:
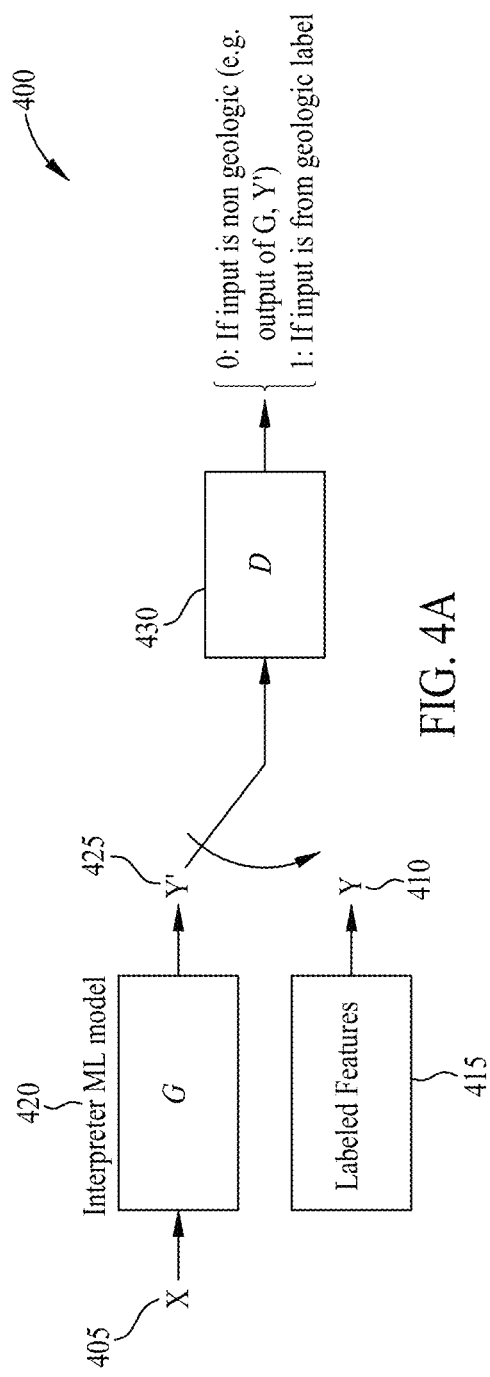
FIG. 4A illustrates a high-level architecture of a machine learning system with an adversarial process.
Figure 4B:
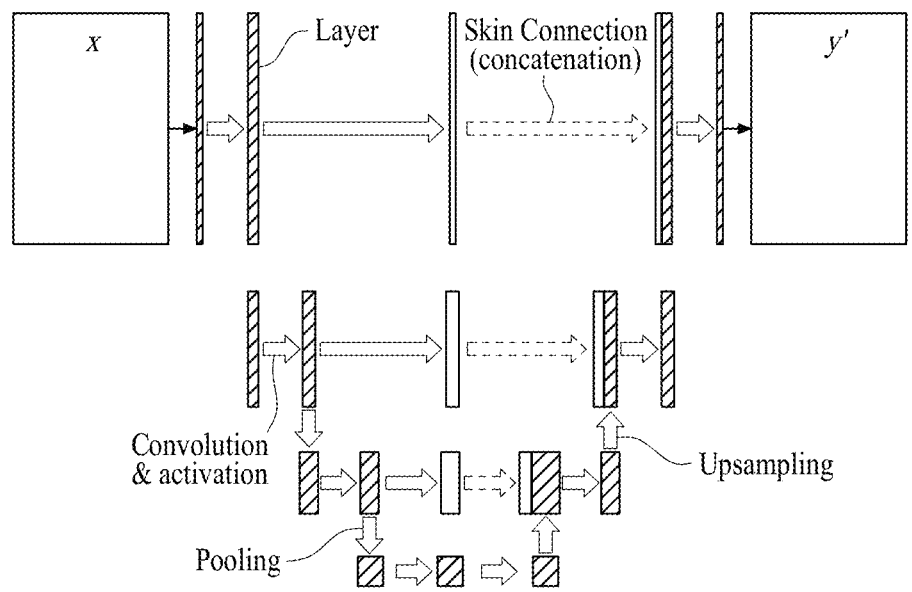
FIG. 4B illustrates a generator model with U-net architecture suitable to be used with the architecture of FIG. 4A.
Figure 4C:
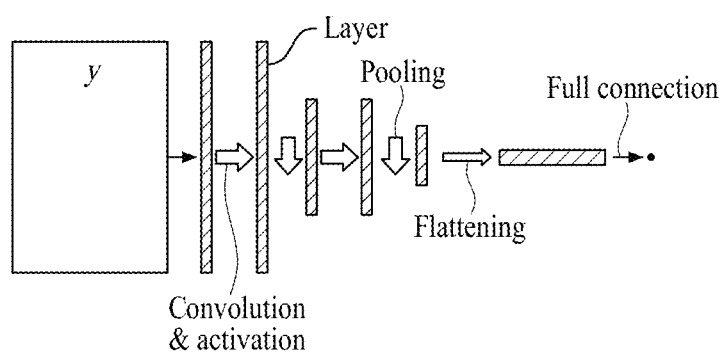
FIG. 4C illustrates a discriminator model with a classifier architecture suitable to be used with the architecture of FIG. 4A.

To produce more geologically-meaningful results, in some embodiments, the ML system may use an adversarial process for automatic and/or unsupervised learning (e.g., without human intervention) of a suitable image prior. For example, FIG. 4A illustrates a high-level architecture 400 of a ML system with an adversarial process. Collection 410 (represented as Y) may be a representative collection of actual desired images. Collection 410 may include one or more labeled features 415 (e.g., manually-labelled faults, geologic priors, and/or other geologic features). Architecture 400 may also include a generator function 420 (e.g., a trainable DNN, CNN, and/or an interpreter ML model as illustrated in FIG. 4B, represented as G). For example, generator function 420 may be configured to generate a collection 425 (represented as Y') of derived images (e.g., output of a fault prediction DNN) based on a collection 405 (represented as X) of seismic images. In some embodiments, generator function 420 may segment each seismic image from collection 405 into multiple objects (e.g., faults, facies) in collection 425. Generator function 420 may be an interpreter ML model. Architecture 400 may also include a discriminator function 430 (e.g., a trainable DNN, CNN, and/or a discriminator ML model as illustrated in FIG. 4C, represented as D). For example, discriminator function 430 may be configured to determine whether or not an input image belongs to a class of actual desired images (or geologic labels). For example, discriminator function 430 may be a binary classifier with 1 representing that the input image belongs to a desired image class, and with 0 representing that the input image does not belong to the desired image class. In some embodiments, discriminator function 430 may determine whether each derived image in collection 425 represents, is similar to, or otherwise matches a geologic prior in collection 410. In some embodiments, architecture 400 may comprise one or more Generative Adversarial Networks (GANs). In some embodiments, generator function 420 and discriminator function 430 may be trained in an alternating fashion (e.g., by alternatingly keeping one function fixed while the other is trained, as described below).

In some embodiments, training of discriminator function 430 may proceed with generator function 420 kept fixed. The training may drive discriminator function 430 to accurately classify input images to determine if the input images are from collection 425 (e.g., derived images generated with generator function 420) or if the input images are from collection 410 (e.g., actual desired images). The training objective for discriminator function 430 can be summarized below:

$$\max_D \{E_Y[\log D(y)] + E_X[\log(1 - D(G(x)))]\} \quad (5)$$

In some embodiments, training of generator function 420 may proceed with discriminator function 430 kept fixed. The training may drive generator function 420 to generate images so that discriminator function 430 classifies the images as belonging to the class of desired images. The training objectives for generator function 420 may be summarized as follows:

$$\min_G \{E_X[\log(1 - D(G(x)))]\} \quad (6)$$

In some embodiments, training of generator function 420 and discriminator function 430 may occur simultaneously, sequentially, and/or alternating in an iterative fashion. For example, in each iteration of training of architecture 400, the training parameters (e.g., the weights of the filters in generator function 420) may be updated once, and subsequently the training parameters of discriminator function 430 may be updated once. Iterations may continue until both the training of generator function 420 and the training of discriminator function 430 converge. For example, iterations may continue until convergence of the objective functions of Equations 5 and 6. For example, convergence may be deemed when the objective function decreases by no more than 0.01% from one iteration to the next. In some embodiments, an interpreter ML model (e.g. generator function 420) and a discriminator ML model (e.g., discriminator function 430) may be trained simultaneously. The interpreter ML model may be trained to estimate the labels (e.g., segmented objects of collection 425) from a seismic volume or a derivative of the seismic volume (e.g., collection 405). The interpreter ML model may also be trained to meet the expectations of the discriminator ML model (e.g., discriminator function 430). The discriminator ML model may be trained to learn the representation of labels (e.g., labeled features 415) from a training set (e.g., collection 410). The discriminator ML model may also be trained to discriminate the labels (e.g., segmented objects of collection 425) estimated by the interpreter ML model (e.g. generator function 420) from the training representation of labels (e.g., labeled features 415). The discriminator ML model and/or the interpreter ML model may be based on DNN.

In some embodiments, the training of the ASI models (e.g., either the interpreter ML model and/or the discriminator ML model) can be regularized to enforce the outputs of the ASI models to be consistent with one or more geologic priors. This may be accomplished, for example, by including a penalty term in the objective function during the training. Such penalty term may measure a distance (e.g., Tikhonov regularization) between the outputs (e.g. discretized values of fault probability maps) and the geologic priors that may be directly learned from the labelled data. Such penalty terms may also reduce the risk of overfitting. The trade-off between data fit and geologic prior fit may be controlled with a regularization weight. Typically, an ASI model can be trained to satisfy both the data fit and geologic prior fit with a regularization weight up to a noise floor determined by the data accuracy. For example, a satisfactory output of the ASI model may be a fault probability distribution with sharp fault boundaries and faults at a location consistent with the training data. However, when the data and geologic priors are in conflict, the regularization weight may be adjusted to enforce geologic priors over data fit when labelled data is not accurate, or data fit over geologic priors when the geologic priors are not consistent with the subsurface. The adjustment of the weight may be determined based on the experience of the skilled person in the art with the benefit of this disclosure.

If an adversarial process alone is used to train the interpreter ML model for seismic interpretation tasks, the interpreter ML model may learn to produce geologically realistic predictions, but the interpreter ML model may be inaccurate (e.g., false-positive or false-negative faults). This may be mitigated by augmenting adversarial training of generator function 420 with another objective function that measures the accuracy of predictions. For example, the adversarial training of generator function 420 may be augmented and/or substituted with a geologic objective function that combines reconstruction loss with geologic fit.

In some embodiments, generator function 420 may also have an alternative training objective. For example, generator function 420 may have an additional training objective to minimize BCE or Dice index for accurate fault prediction. In some embodiments, training generator function 420 includes paired goals: to optimize the accuracy of fault prediction, and to optimize the geologic fit measured by discriminator function 430, so that the prediction is both accurate and geologically realistic.

Figure 5A:
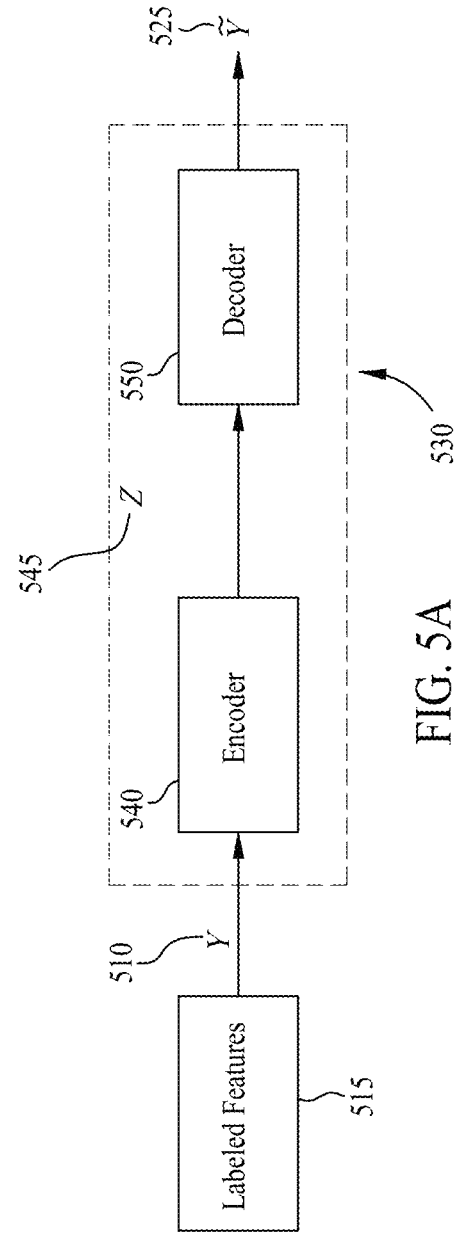
FIGS. 5A and 5B illustrate autoencoders that may be used in the machine learning systems of FIGS. 4A-4C.
Figure 5B:
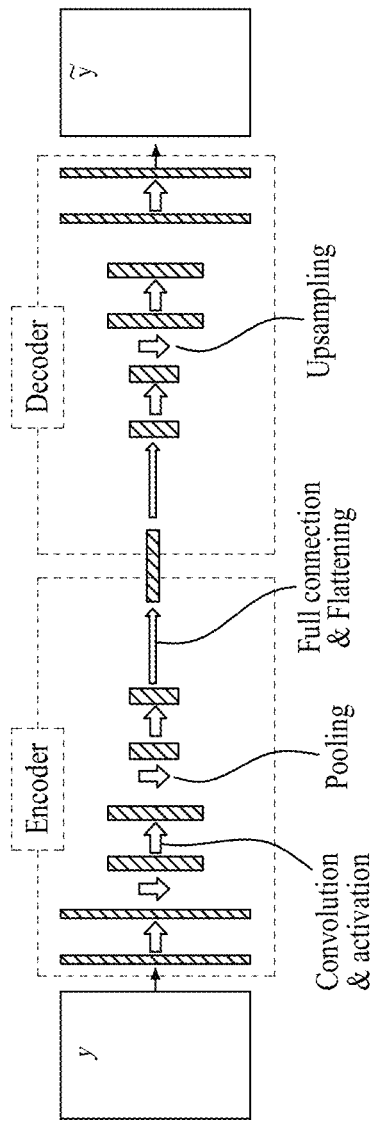

In some embodiments, the geological expectations for the interpreter ML model (e.g., generator function 420) can be enforced by an autoencoder ML model trained with samples of geologic labels. The autoencoder ML model may be utilized in addition to or in lieu of a discriminator ML model (e.g., discriminator function 430). As illustrated in FIG. 5A, an autoencoder 530 may include two neural networks: an encoder function 540 and a decoder function 550. For example, an autoencoder 530 may include a trainable DNN (e.g., a CNN), as illustrated in FIG. 5B. The encoder function 540 takes collection 510 (represented as Y) as input. Collection 510 may be a representative collection of geologic priors and/or features, such as labeled features 515. Encoder function 540 may compress collection 510 into a lower dimensional collection 545 (represented as Z). The decoder function 550 may take the collection 545 and reconstructs the input label collection 525 (represented as Ŷ). The encoder function 540 and the decoder function 550 may be trained to minimize the reconstruction loss: min‖Y−Ŷ‖, where ‖ ‖ is a norm, such as a least square norm.

Figures 6, 7:
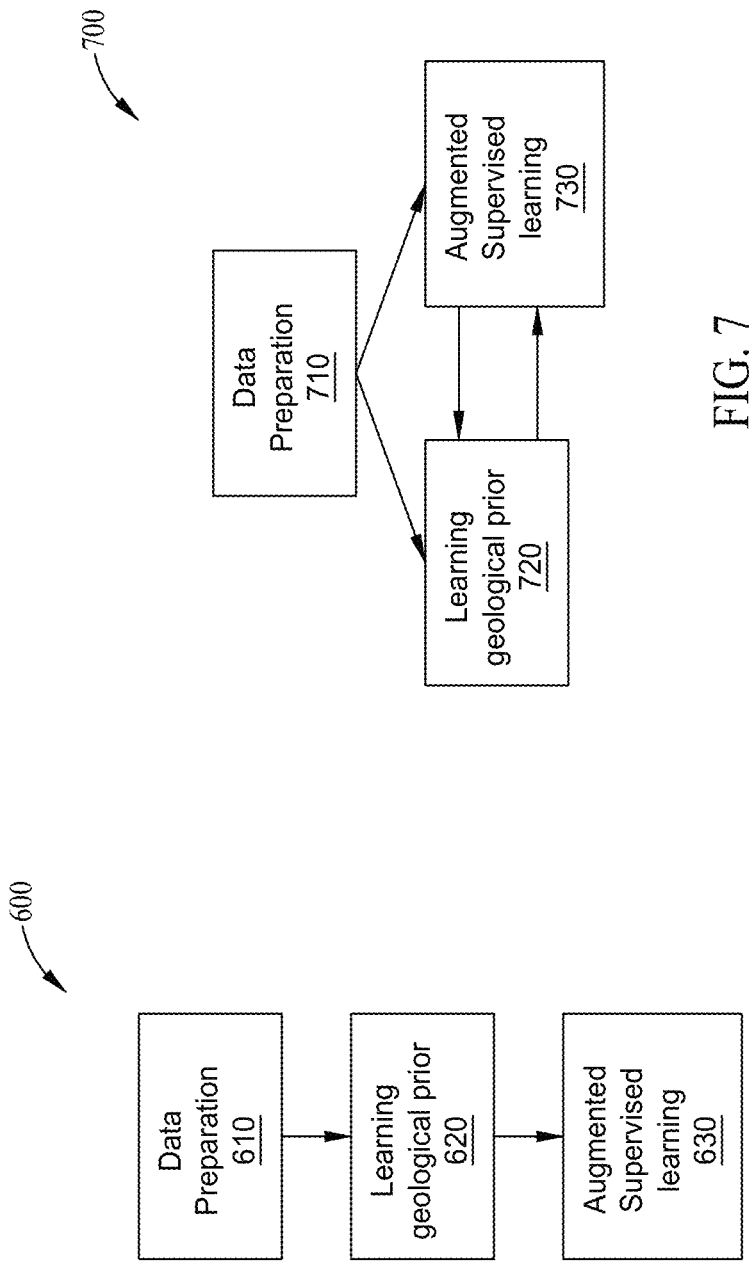
FIG. 6 illustrates an exemplary method that may improve the quality of the seismic interpretation by incorporating geologic priors in the training.
FIG. 7 illustrates another exemplary method that may improve the quality of the seismic interpretation by incorporating geologic priors in the training.

FIG. 6 illustrates an exemplary method 600 that may improve the quality of the seismic interpretation by incorporating geologic priors in the training. Method 600 may be referred to as a "sequential training" process. Generally, a sequential training method first includes learning geologic representations using a GAN or an autoencoder ML model with samples of the training labels (e.g., fault masks). A sequential training method then also includes training ASI models using a geologic objective functional (e.g., the encoder of the autoencoder ML model or the discriminator ML model of the GAN) along with the reconstruction loss. As illustrated, method 600 begins at block 610 where data is prepared. For example, at block 610, a set of manually-labelled geological features (e.g. horizon features, fault features, or other features labeled or otherwise identified by suitable means, such as expert identification) are provided as training data. In some embodiments, data preparation at block 610 may include a data augmentation process (e.g., to increase the available training data). Suitable data augmentation processes and methods are further described hereinbelow, and also are described in U.S. Provisional Application Ser. No. 62/826,095, entitled "Data Augmentation for Seismic Interpretation Systems and Methods" filed Mar. 29, 2019, which is herein incorporated by reference.

Method 600 may continue at block 620 where geologic priors may be learned by a ML system (e.g., a CNN-based architecture). In some embodiments, the ML system may automatically learn the geologic priors using an adversarial process (e.g., as discussed above with reference to FIG. 4A). Learning geologic priors at block 620 may also, or alternatively, include use of an autoencoder ML model (e.g., autoencoder 530) to learn a geologic prior. In some embodiments, the ML system may utilize a geologic objective function to learn the geologic prior at block 620. For example, a seismic interpretation task (e.g., fault prediction, reservoir detection, horizon interpretation, environment of deposition detection, and/or salt-body detection) may be framed as an image-segmentation task, rather than a classification problem per voxel, pixel, or other unit of volume/area. The quality of a fault prediction may be improved by adding geologic prior information in the training. A geologic prior may be derived as a ML model that quantifies resemblance of a given image to a desired class of images. For example, a ML model may be derived to quantify how closely a fault predicted by a DNN resembles human-labelled faults. The fault prediction maps of FIGS. 1B-1D, 2B-2D, and 3B-3D, for example, differ from human-labeled fault maps, which are binary (e.g., each voxel is either 1 (faults) or 0 (no-faults)). Adding an image prior to the training may highlight this disparity, and a training routine may be devised to minimize the disparity (for instance, by biasing the model to be more likely to output either a 1 or a 0 value, instead of outputting middling values (0.2, 0.3, 0.5, 0.6, 0.7, etc.). In some embodiments, an encoder function (e.g., encoder function 540) from a trained autoencoder ML model (e.g., autoencoder 530) may be used for a discriminator function for learning a geologic prior.

Method 600 may continue at block 630 where the ML system undergoes augmented supervised learning (e.g., adversarial learning and/or autoencoder methodologies) to learn a geologic prior. For example, the ML system may incorporate the geologic priors (from block 620) into the geologic objective function. For example, the geologic objective function may have the following form where p is the output of the interpreter ML model (e.g., generator function 420):

$$\min\{RL(y,p)+GP(p)\} \quad (7)$$

where y and p are samples from Y and Y' respectively, RL(y, p) is the reconstruction loss such as BCE (Equation (1)) or Dice index (Equation (3)) and GP is the learned geologic prior or representation through the discriminator ML model or autoencoder ML model. The objective function described in Equation 7 incorporates a geologic prior term GP (p) learned from GAN or autoencoder into a reconstruction loss RL(y, p) from conventional supervised learning. For example:

$$\min\{BCE(y,p)+E_X[\log(1-D(p))]\} \quad (8)$$

or GP (p) is based on the encoder model of the autoencoder ML model.

FIG. 7 illustrates another exemplary method 700 that may improve the quality of the seismic interpretation by incorporating geologic priors in the training. Method 700 may be referred to as a "simultaneous training" or an "adversarial training" process. Generally, a simultaneous training method includes training a discriminator ML model and an ASI model together. For example, ASI model training may use a training set (e.g., seismic images and fault labels) and a geologic objective functional which involves a discriminator ML model and reconstruction loss. Training the discriminator ML model involves outputs of the ASI model and the training labels. As illustrated, method 700 begins at block 710 where data is prepared (similar to block 610 of FIG. 6). Method 700 may continue in an alternating fashion between block 720, where geologic priors may be learned (similar to block 620 of FIG. 6), and block 730, where the ML system undergoes augmented supervised learning (similar to block 630 of FIG. 6). (It should be understood that "alternating" herein includes possibly multiple repetitions of a first type, then possibly multiple repetitions of a second type, and then possibly multiple repetitions of the first type, etc. Therefore "alternating" includes patterns such as A-B-A-B-A-B-A, as well as AA-B-A-BB-A, and AA-BBB-A-BBBBB-AA-B-A, etc.) By alternating between blocks 720 and 730, the ML system may simultaneously learn geological priors (at block 720) and perform augmented supervised learning (at block 730). In block 720, a discriminator ML model or an autoencoder ML model learns geologic prior GP(p) (e.g., to minimize GAN loss). In block 730, an interpreter ML model learns (e.g., by minimizing supervised learning loss) to predict accurate and geologically realistic labels using a geologic objective function (e.g., the geologic objective function expressed in Equation 7). In some embodiments, only the GP(p) or RL(y, p) term may be used as geologic objective function to train the interpreter ML model of 730. In some other embodiments, GP(p) and RL(y, p) terms in the geologic objective functions can be minimized in an alternating strategy similar to the one used in the adversarial process. In some embodiments, an ML model may learn the geologic prior at block 720 for n steps while freezing the ML model at block 730; then, the ML model at block 730 may be trained with augmented supervised learning for m steps while freezing the ML model at block 720. In such case, n and m may be determined a priori or adaptively by monitoring the loss functions of the ML models at block 720 and block 730.

Figure 10A:
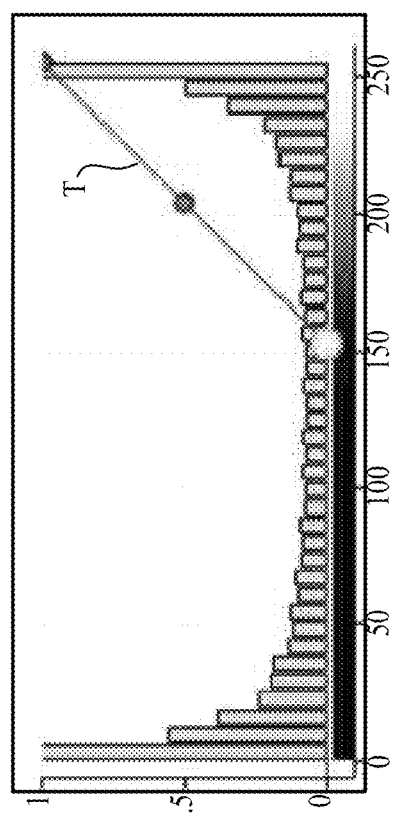
Figure 10D:
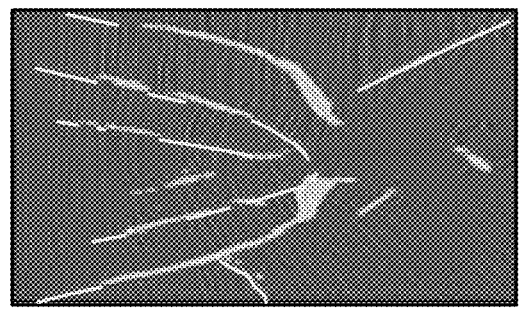
Figure 10C:
Figure 10B:
Figure 11A:
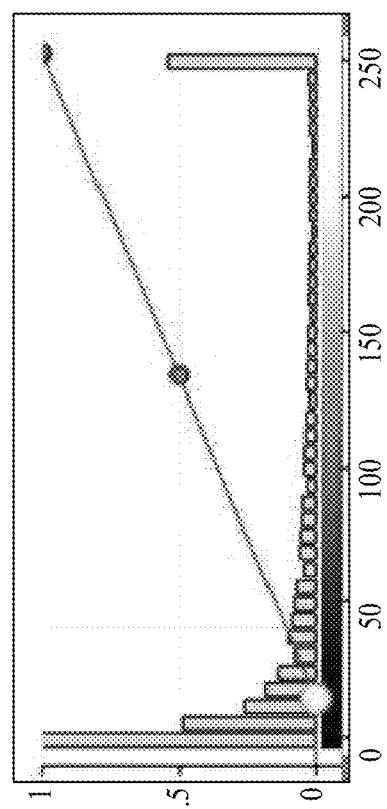
Figure 11D:
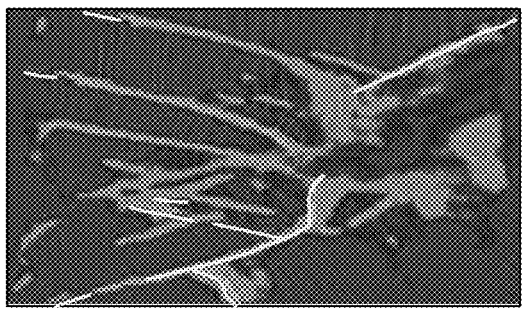
Figure 11C:
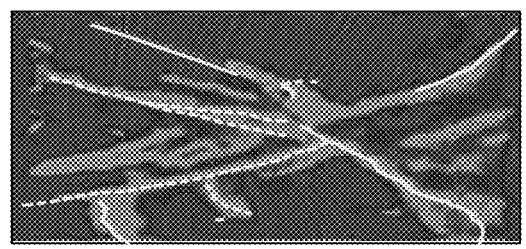
Figure 11B:
Figure 12A:
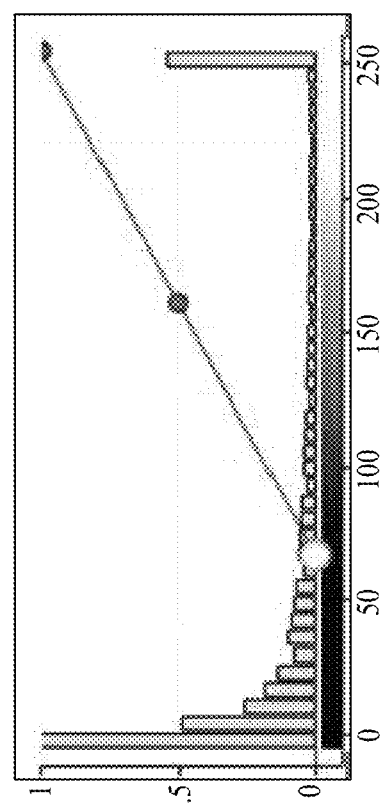
Figure 12D:
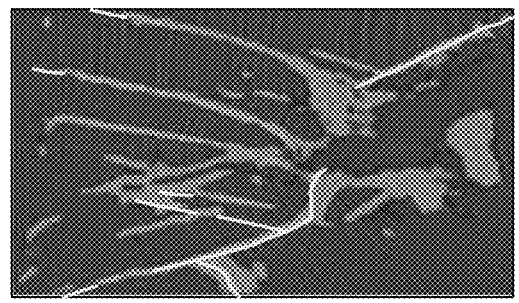
Figure 12C:
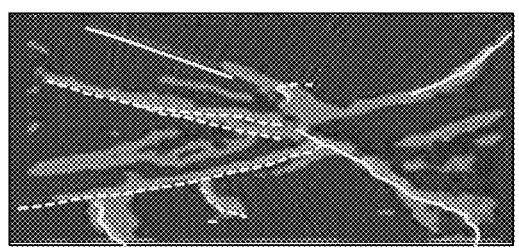
Figure 12B:
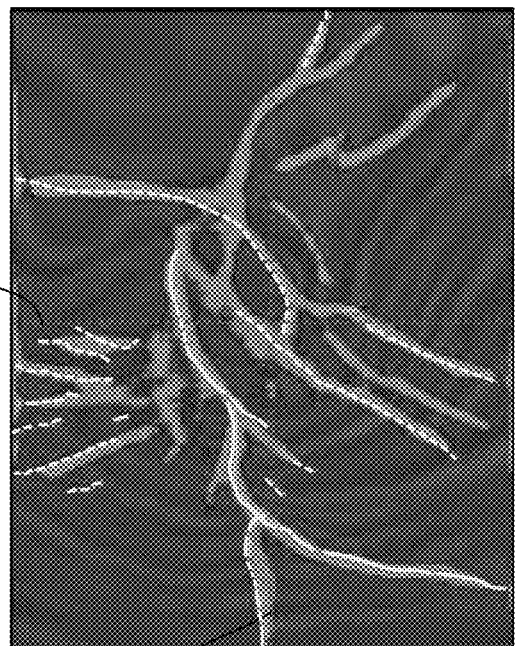
Figure 13A:
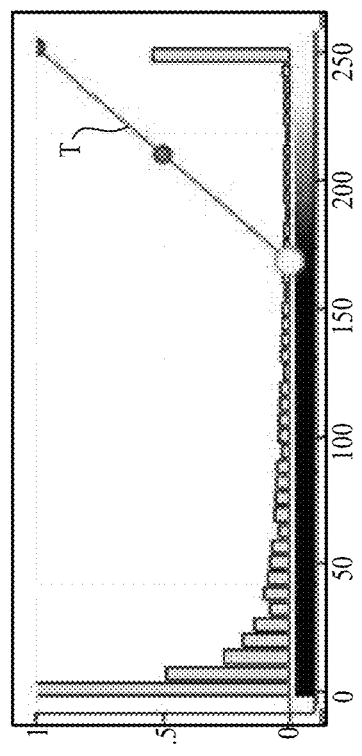
Figure 13D:
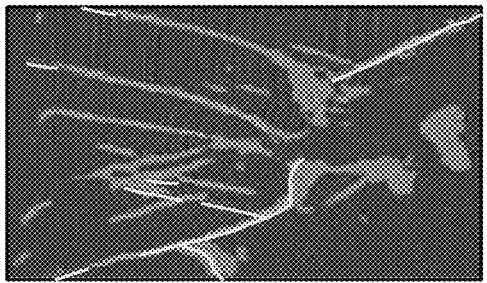
Figure 13C:
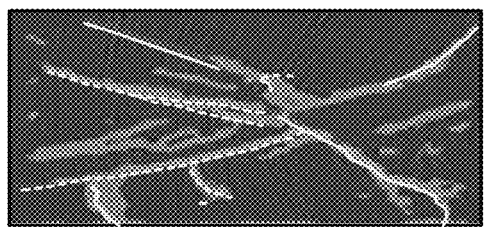
Figure 13B:

FIGS. 8A, 8B, 8C, 8D, 9A, 9B, 9C, 9D, 10A, 10B, 10C, and 10D illustrate the results of fault prediction obtained using method 700 where the interpreter ML model is based on a U-net model and trained with Dice index and GP (p) (e.g., as learned at block 720) using an alternating strategy. In other words, method 700 is applied to minimize two different objective functions while updating a single ML model. For example, GAN loss may be minimized at block 720, and Dice loss may be minimized at block 730, while sharing a single U-net model. Each of FIGS. 8A, 9A, and 10A illustrates a histogram of fault predictions, ranging from normalized occurrence frequency 0 to 1, and image intensity level 0 to 255. FIGS. 8A, 9A, and 10A differ in the threshold selected to include in the fault probability maps of FIGS. 8B-8D, 9B-9D, and 10B-10D (e.g., only predictions to the right of each threshold line T are opaque in the fault probability maps). Note that FIGS. 8C, 9C, and 10C are vertical slices (at line C) through each of FIGS. 8B, 9B, and 10B (respectively), and FIGS. 8D, 9D, and 10D are horizontal slices (at line D) through each of FIGS. 8B, 9B, and 10B (respectively). The results can be seen to be more assertive in identifying the faults in the fault probability maps. Note that most of the predictions of the histograms of FIGS. 8A, 9A, and 10A are in the neighborhood of either 0 or 255. Furthermore, the fault probability maps of FIGS. 8B-8D, 9B-9D, and 10B-10D do not depend on the threshold value. Post-processing with manual interpretation (e.g., to select an appropriate threshold) may be significantly reduced or eliminated.

FIGS. 11A, 11B, 11C, 11D, 12A, 12B, 12C, 12D, 13A, 13B, 13C, and 13D illustrate an example of the fault prediction using method 700 where the interpreter ML model is based on a U-net model and trained jointly with BCE and GP(p). For example, both GAN and BCE may be minimized at block 720, while only BCE is minimized at block 730. In other words, both GAN loss and reconstruction loss are minimized while updating a single ML model. As with the histograms of FIGS. 8A, 9A, and 10A, in FIGS. 11A, 12A, and 13A, most of the predictions are close to either 255 or 0. Also, as with FIGS. 8B-8D, 9B-9D, and 10B-10D, in FIGS. 11B-11D, 12B-12D, and 13B-13D, the fault probability map results do not depend on the selected threshold.

In practical applications, the present technological advancement must be used in conjunction with a seismic data analysis system (e.g., a high-speed computer, and which may equivalently and more generically be referred to simply as a "computer") programmed in accordance with the disclosures herein. Preferably, in order to efficiently perform the machine learning functions described herein (e.g., training an ML system and/or training an interpreter ML model or discriminator ML model; and/or applying such trained models or systems), the seismic data analysis system is a high performance computer (HPC), as known to those skilled in the art. Such high performance computers typically involve clusters of nodes, each node having multiple CPUs and/or graphics processing unit (GPU) clusters, and computer memory, with configuration that allows parallel (and particularly massively parallel) computation. The models may be visualized and edited using any interactive visualization programs and associated hardware, such as monitors and projectors. The architecture of the system may vary and may be composed of any number of suitable hardware structures capable of executing logical operations and displaying the output according to the present technological advancement. Those of ordinary skill in the art are aware of suitable supercomputers available from Cray or IBM, as well as other architectures such as HPCs with multiple GPU clusters.

As will be appreciated from the above discussion, in certain embodiments of the present approach, expert inputs are elicited that will have the most impact on the efficacy of a learning algorithm employed in the analysis, such as a classification or ranking algorithm, and which may involve eliciting a judgment or evaluation of classification or rank (e.g., right or wrong, good or bad) by the reviewer with respect to a presented query. Such inputs may be incorporated in real time in the analysis of seismic data, either in a distributed or non-distributed computing framework. In certain implementations, queries to elicit such input are generated based on a seismic data set undergoing automated evaluation and the queries are sent to a workstation for an expert to review.

Figure 14:
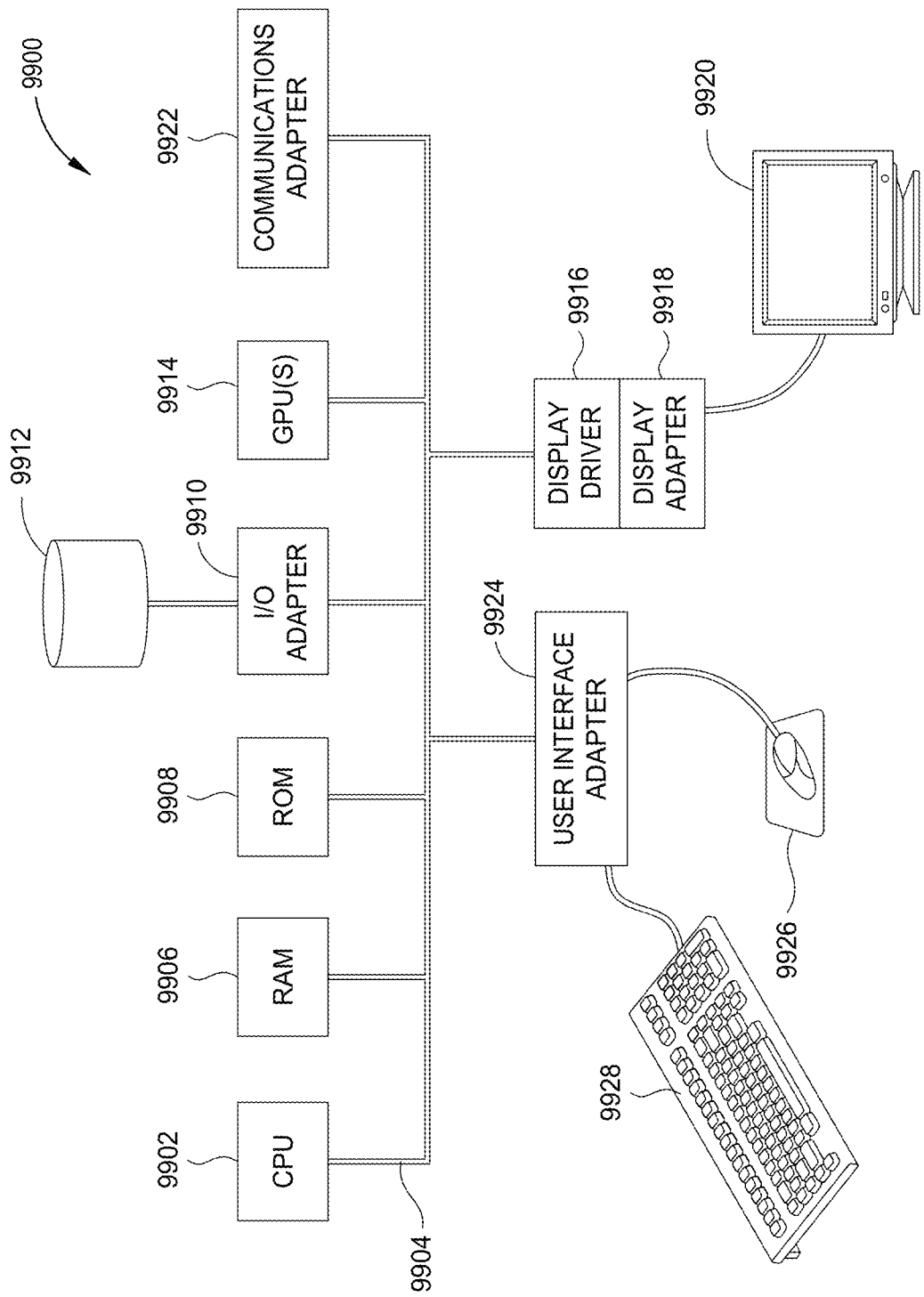
FIG. 14 illustrates a block diagram of a seismic data analysis system upon which the present technological advancement may be embodied.

FIG. 14 illustrates a block diagram of a seismic data analysis system 9900 upon which the present technological advancement may be embodied. A central processing unit (CPU) 9902 is coupled to system bus 9904. The CPU 9902 may be any general-purpose CPU, although other types of architectures of CPU 9902 (or other components of exemplary system 9900) may be used as long as CPU 9902 (and other components of system 9900) supports the operations as described herein. Those of ordinary skill in the art will appreciate that, while only a single CPU 9902 is shown in FIG. 14, additional CPUs may be present. Moreover, the system 9900 may comprise a networked, multi-processor computer system that may include a hybrid parallel CPU/GPU system. The CPU 9902 may execute the various logical instructions according to various teachings disclosed herein. For example, the CPU 9902 may execute machine-level instructions for performing processing according to the operational flow described.

The seismic data analysis system 9900 may also include computer components such as non-transitory, computer-readable media. Examples of computer-readable media include a random access memory (RAM) 9906, which may be SRAM, DRAM, SDRAM, or the like. The system 9900 may also include additional non-transitory, computer-readable media such as a read-only memory (ROM) 9908, which may be PROM, EPROM, EEPROM, or the like. RAM 9906 and ROM 9908 hold user and system data and programs, as is known in the art. The system 9900 may also include an input/output (I/O) adapter 9910, a communications adapter 9922, a user interface adapter 9924, and a display adapter 9918; the system 9900 may potentially also include one or more graphics processor units (GPUs) 9914, and one or more display drivers 9916. In some instances, multiple GPUs 9914 may be utilized, potentially in clusters of GPUs, for massively parallel computation tasks suited to the high number of compute cores present on some GPUs. The compute tasks, as the skilled artisan will recognize, need not necessarily be restricted only to display-related functions, but instead may be general purpose and suited for handling by parallel GPU processing capability.

The I/O adapter 9910 may connect additional non-transitory, computer-readable media such as storage device(s) 9912, including, for example, a hard drive, a compact disc (CD) drive, a floppy disk drive, a tape drive, and the like to seismic data analysis system 9900. The storage device(s) may be used when RAM 9906 is insufficient for the memory requirements associated with storing data for operations of the present techniques. The data storage of the system 9900 may be used for storing information and/or other data used or generated as disclosed herein. For example, storage device(s) 9912 may be used to store configuration information or additional plug-ins in accordance with the present techniques. Further, user interface adapter 9924 couples user input devices, such as a keyboard 9928, a pointing device 9926 and/or output devices to the system 9900. The display adapter 9918 is driven by the CPU 9902 to control the display on a display device 9920 to, for example, present information to the user. For instance, the display device may be configured to display visual or graphical representations of any or all of the models and data representations discussed herein (e.g., seismic images, feature probability maps, feature objects, etc.). As the models themselves are representations of geophysical data, such a display device may also be said more generically to be configured to display graphical representations of a geophysical data set, which geophysical data set may include the models and data representations discussed herein, as well as any other geophysical data set those skilled in the art will recognize and appreciate with the benefit of this disclosure.

The architecture of seismic data analysis system 9900 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the system 9900 may include various plug-ins and library files. Input data may additionally include configuration information.

Seismic data analysis system 9900 may include one or more machine learning architectures, such as deep learning models, neural networks, convolutional neural networks, fully-convolutional U-net architectures, DNNs, GANs, etc. The machine learning architectures may be trained on various training data sets. The machine learning architectures may be applied to analysis and/or problem solving related to various unanalyzed data sets. In should be appreciated that the machine learning architectures perform training and/or analysis that exceed human capabilities and mental processes. The machine learning architectures, in many instances, function outside of any preprogrammed routines (e.g., varying functioning dependent upon dynamic factors, such as data input time, data processing time, data set input or processing order, and/or a random number seed). Thus, the training and/or analysis performed by machine learning architectures is not performed by predefined computer algorithms and extends well beyond mental processes and abstract ideas.

The above-described techniques, and/or systems implementing such techniques, can further include hydrocarbon management based at least in part upon the above techniques. For instance, methods according to various embodiments may include managing hydrocarbons based at least in part upon models and data representations (e.g., seismic images, feature probability maps, feature objects, etc.) constructed according to the above-described methods. In particular, such methods may include drilling a well, and/or causing a well to be drilled, based at least in part upon the models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well. For instance, prospect identification may be aided by producing derivative seismic volumes of probabilities that correspond to direct hydrocarbon indicators based on models that have been trained on corporate datasets with known accumulations or from other datasets with known accumulations in the same basin (e.g., related by proximity). Once identified, predictions of seismic facies and/or environments of deposition may be used to better understand reservoir parameters, such as net-to-gross, which is a geologic parameter associated with the reservoir fraction in a particular depositional system. Fault probability predictions can also be used to aid integrated trap analyses done at the prospect to better constrain where the hydrocarbon-water fluid contact is expected to occur, further constraining hydrocarbon volumes. Once a reservoir or basin is identified (e.g., by drilling exploration wells), any of these products, or combinations and/or refined versions thereof, may be used to better define compartmentalization, reservoir distribution, flow behavior, etc. The above-described techniques, and/or systems implementing such techniques, may thereby be useful for field development planning and drilling decisions.

The foregoing description is directed to particular example embodiments of the present technological advancement. It will be apparent, however, to one skilled in the art, that many modifications and variations to the embodiments described herein are possible. All such modifications and variations are intended to be within the scope of the present disclosure, as defined in the appended claims.

The invention claimed is:

1. A method of training a machine learning (ML) system for seismic interpretation, comprising:
preparing a collection of seismic images as training data;
training an interpreter ML model to learn to interpret the training data by performing adversarial training of a generator function that is augmented by a geologic objective function that combines reconstruction loss with geologic fit so that the adversarial training of the augmented generator function both optimizes for accuracy of fault prediction and optimizes the geologic fit measured by a discriminator ML model; and
training the discriminator ML model to learn one or more geologic priors from the training data;
wherein the augmented generator function generates outputs for input to the discriminator ML model.

2. The method of claim 1, wherein training the discriminator ML model comprises training the discriminator ML model to classify derived images generated by the interpreter ML model.

3. The method of claim 2, wherein the each of the derived images comprises a segment of one of the seismic images.

4. The method of claim 1, wherein the seismic interpretation includes at least one of:
fault prediction,
salt body detection,
horizon interpretation,
environment of deposition detection, and
reservoir detection.

5. The method of claim 1, wherein the geologic objective function comprises at least one of:
a Jaccard index;
a Dice index; and
a cosine similarity.

6. The method of claim 1, wherein at least one of the interpreter ML model and the discriminator ML model comprises a deep neural network (DNN).

7. The method of claim 1, wherein the one or more geologic priors comprise at least one of:
faults,
horizons,
environment of deposition detection, and
salt-bodies.

8. The method of claim 1, further comprising alternating between training the interpreter ML model and training the discriminator ML model until both trainings converge.

9. The method of claim 1, wherein each of training the interpreter ML model and training the discriminator ML model is carried out using a seismic data analysis system.

10. The method of claim 1, further comprising:
obtaining test data comprising a second collection of seismic images;
applying the trained ML system to the test data to generate output; and
managing hydrocarbons based on the output.

11. The method of claim 10, wherein applying the trained ML system to the test data to generate the output is carried out using a seismic data analysis system.

12. The method of claim 10, wherein:
the collection of seismic images prepared as training data correspond to a first subsurface formation;
the second collection of seismic images correspond to a second subsurface formation; and
the first subsurface formation is related to the second subsurface formation by proximity.

13. A machine learning (ML) system for seismic interpretation, comprising:
training data recorded in computer memory and comprising a collection of manually-labeled seismic images;
an interpreter ML model represented in executable code and comprising a geologic objective function and configured to learn to interpret the training data by performing adversarial training of a generator function that is augmented by the geologic objective function that combines reconstruction loss with geologic fit so that the adversarial training of the augmented generator function both optimizes for accuracy of fault prediction and optimizes the geologic fit measured by a discriminator ML model; and
the discriminator ML model represented in executable code and configured to learn one or more geologic priors from the training data;
wherein the augmented generator function is configured to generate outputs for input to the discriminator ML model.

14. The ML system of claim 13, wherein:
the interpreter ML model is configured to be regularized by the one or more geologic priors, and
the discriminator ML model is configured to learn to classify derived images generated by the interpreter ML model.

15. The ML system of claim 14, wherein each of the derived images comprises a segment of one of the seismic images.

16. The ML system of claim 14, wherein the seismic interpretation includes at least one of:
fault prediction,
horizon interpretation,
environment of deposition detection,
reservoir detection, and
salt-body detection.

17. The ML system of claim 13, wherein the geologic objective function comprises at least one of:
a Jaccard index;
a Dice index; and
a cosine similarity.

18. The ML system of claim 13, wherein at least one of the interpreter ML model and the discriminator ML model comprises a deep neural network (DNN).

19. The ML system of claim 13, wherein the one or more geologic priors comprise at least one of:
faults,
horizons,
environment of deposition, and
salt-bodies.

20. A method of automated seismic interpretation, comprising:
preparing a collection of seismic images as training data;
training an interpreter ML model to learn to interpret the training data by performing adversarial training of a generator function that is augmented by a geologic objective function that combines reconstruction loss with geologic fit so that the adversarial training of the augmented generator function both optimizes for accuracy of fault prediction and optimizes the geologic fit measured by a discriminator ML model, and wherein the training of the interpreter ML model is regularized by one or more geologic priors;
training the discriminator ML model to learn the one or more geologic priors from the training data;
obtaining test data comprising geophysical data for a subsurface region; and
performing an inference on the test data with the trained interpreter ML model and the trained discriminator ML model to generate a feature probability map representative of subsurface features of the subsurface region.

21. The method of claim 20, further comprising managing hydrocarbons in the subsurface region based at least in part on the feature probability map.

* * * * *